United States Patent
Irukuvajhula et al.

(10) Patent No.: US 11,189,275 B2
(45) Date of Patent: Nov. 30, 2021

(54) NATURAL LANGUAGE PROCESSING WHILE SOUND SENSOR IS MUTED

(71) Applicant: Polycom, Inc., San Jose, CA (US)

(72) Inventors: Subramanyam Irukuvajhula, Hyderabad (IN); Ravi Kiran Nalla, Hyderabad (IN)

(73) Assignee: Polycom, Inc., San Jose, CA (US)

( * ) Notice: Subject to any disclaimer, the term of this patent is extended or adjusted under 35 U.S.C. 154(b) by 121 days.

(21) Appl. No.: 16/170,327

(22) Filed: Oct. 25, 2018

(65) Prior Publication Data

US 2020/0043486 A1 Feb. 6, 2020

(30) Foreign Application Priority Data

Aug. 2, 2018 (IN) .............................. 201811029163

(51) Int. Cl.
*G10L 15/22* (2006.01)
*G10L 15/08* (2006.01)
*H04L 29/06* (2006.01)
*G06F 3/16* (2006.01)
*H04M 3/56* (2006.01)

(52) U.S. Cl.
CPC .............. *G10L 15/22* (2013.01); *G06F 3/165* (2013.01); *G10L 15/08* (2013.01); *H04L 29/06414* (2013.01); *H04M 3/568* (2013.01); *G10L 2015/088* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 6,757,362 B1* | 6/2004 | Cooper | H04M 3/527 379/88.01 |
| 6,804,332 B1* | 10/2004 | Miner | H04M 3/42 379/88.13 |
| 8,380,521 B1 | 2/2013 | Maganti et al. | |
| 9,584,653 B1* | 2/2017 | Lyren | G06F 3/04842 |
| 2007/0003044 A1* | 1/2007 | Liang | H04L 65/4007 379/215.01 |
| 2008/0208594 A1* | 8/2008 | Cross | G10L 15/26 704/275 |
| 2012/0128146 A1* | 5/2012 | Boss | H04M 3/56 379/202.01 |

(Continued)

*Primary Examiner* — Fariba Sirjani
(74) *Attorney, Agent, or Firm* — Keith Lutsch PC

(57) ABSTRACT

A method includes generating first audio data based on sound detected by a sound sensor at a first time. The method further includes transmitting, via one or more communication interfaces, the first audio data to another device during a communication session based on a determination that the sound sensor is unmuted with respect to the communication session at the first time. The method further includes generating second audio data based on sound detected by the sound sensor at a second time. The method further includes refraining from transmitting the second audio data to the other device during the communication session based on a determination that the sound sensor is muted with respect to the communication session at the second time. The method further includes initiating a natural language processing operation on the second audio data based on detecting a wake phrase in the second audio data.

10 Claims, 14 Drawing Sheets

(56) References Cited

U.S. PATENT DOCUMENTS

| | | | |
|---|---|---|---|
| 2012/0166184 A1* | 6/2012 | Locker | G10L 15/22 |
| | | | 704/201 |
| 2014/0297288 A1* | 10/2014 | Yu | G10L 15/30 |
| | | | 704/275 |
| 2015/0331666 A1* | 11/2015 | Bucsa | G10L 15/22 |
| | | | 704/275 |
| 2016/0227025 A1* | 8/2016 | Soby | H04M 3/428 |
| 2017/0040018 A1* | 2/2017 | Tormey | H04L 12/4633 |
| 2018/0157333 A1* | 6/2018 | Ross | G06F 21/6245 |
| 2019/0005953 A1* | 1/2019 | Bundalo | G10L 15/22 |
| 2019/0042187 A1* | 2/2019 | Truong | H04L 12/282 |
| 2019/0043521 A1* | 2/2019 | Maziewski | G06F 3/165 |
| 2019/0102145 A1* | 4/2019 | Wilberding | H04N 21/42203 |
| 2019/0147905 A1* | 5/2019 | Mai | G06F 3/167 |
| | | | 704/275 |
| 2019/0221209 A1* | 7/2019 | Bulpin | H04M 3/563 |
| 2019/0341033 A1* | 11/2019 | Hammons | G10L 15/22 |

\* cited by examiner

NATURAL LANGUAGE PROCESSING WHILE SOUND SENSOR IS MUTED

CROSS REFERENCE TO RELATED APPLICATIONS

This application claims the benefit of Indian Provisional Application No. 201811029163 filed Aug. 2, 2018, the contents of which are incorporated herein in their entirety by reference.

TECHNICAL FIELD

The present disclosure relates generally to natural language processing while a sound sensor is muted.

BACKGROUND

Speech recognition systems are becoming increasingly popular means for users to interact with computing devices. A variety of speech recognition services enable users to control such computing devices and gain information without the need for a visual user interface, buttons, or other controls. To illustrate, a speech recognition service can change the channel on a television, control lights or doors, look up news, or perform a variety of other tasks based on detected speech.

Such speech recognition systems may be integrated into communication devices. Accordingly, a communication device may provide speech recognition service during a communication session (e.g., teleconference) with another communication device. However, when a sound sensor of the communication device is muted during such the communication session, the communication device may be unable to provide speech recognition services.

SUMMARY

Systems and methods according to the disclosure enable a device to detect and initiate processing of a spoken command spoken during a communication session while a sound sensor is muted with respect to the communication session. In an illustrative example, during a communication session (e.g., a teleconference, a peer-to-peer call, etc.) between a first communication device and a second communication device, the first communication device transmits audio data to the second communication device while a sound sensor of the first device is unmuted with respect to the communication session. During the communication session, the first communication device receives a command to mute the sound sensor with respect to the communication session. While the sound sensor is muted, the first communication device refrains from transmitting audio data to the second communication device. Further, the first communication device monitors the audio data for a wake phrase while the sound sensor is muted. Based on detecting the wake phrase, the first communication device initiates natural language processing of the audio data. The natural language processing of the audio data may be carried out at the first communication device or a remote natural language processing service device.

An apparatus includes a sound sensor. The apparatus further includes one or more communication interfaces and one or more processor devices. The apparatus further includes one or more memory devices storing instructions executable by the one or more processor devices to generate first audio data based on sound detected by the sound sensor at a first time. The instructions are further executable by the one or more processor devices to initiate transmission, via the one or more communication interfaces, of the first audio data to another device during a communication session based on a determination that the sound sensor is unmuted with respect to the communication session at the first time. The instructions are further executable by the one or more processor devices to generate second audio data based on sound detected by the sound sensor at a second time. The instructions are further executable by the one or more processor devices to refrain from initiating transmission of the second audio data to the other device during the communication session based on a determination that the sound sensor is muted with respect to the communication session at the second time. The instructions are further executable by the one or more processor devices to initiate a natural language processing operation on the second audio data based on detecting a wake phrase in the second audio data.

A computer readable storage device stores instructions executable by one or more processor devices to generate first audio data based on sound detected by a sound sensor at a first time. The instructions are further executable by the one or more processor devices to initiate transmission, via one or more communication interfaces, of the first audio data to another device during a communication session based on a determination that the sound sensor is unmuted with respect to the communication session at the first time. The instructions are further executable by the one or more processor devices to generate second audio data based on sound detected by the sound sensor at a second time. The instructions are further executable by the one or more processor devices to refrain from initiating transmission of the second audio data to the other device during the communication session based on a determination that the sound sensor is muted with respect to the communication session at the second time. The instructions are further executable by the one or more processor devices to initiate a natural language processing operation on the second audio data based on detecting a wake phrase in the second audio data.

A method includes generating first audio data based on sound detected by a sound sensor at a first time. The method further includes transmitting, via one or more communication interfaces, the first audio data to another device during a communication session based on a determination that the sound sensor is unmuted with respect to the communication session at the first time. The method further includes generating second audio data based on sound detected by the sound sensor at a second time. The method further includes refraining from transmitting the second audio data to the other device during the communication session based on a determination that the sound sensor is muted with respect to the communication session at the second time. The method further includes initiating a natural language processing operation on the second audio data based on detecting a wake phrase in the second audio data.

BRIEF DESCRIPTION OF THE DRAWINGS

Embodiments described herein are illustrated by way of example and not limitation in the figures of the accompanying drawings, in which like references indicate similar features. It should be understood that the full scope of the inventions disclosed herein are not limited to the precise arrangements, dimensions, and instruments shown. Furthermore, in the drawings, some conventional details have been omitted so as not to obscure the inventive concepts described herein.

DETAILED DESCRIPTION

Figure 1A:
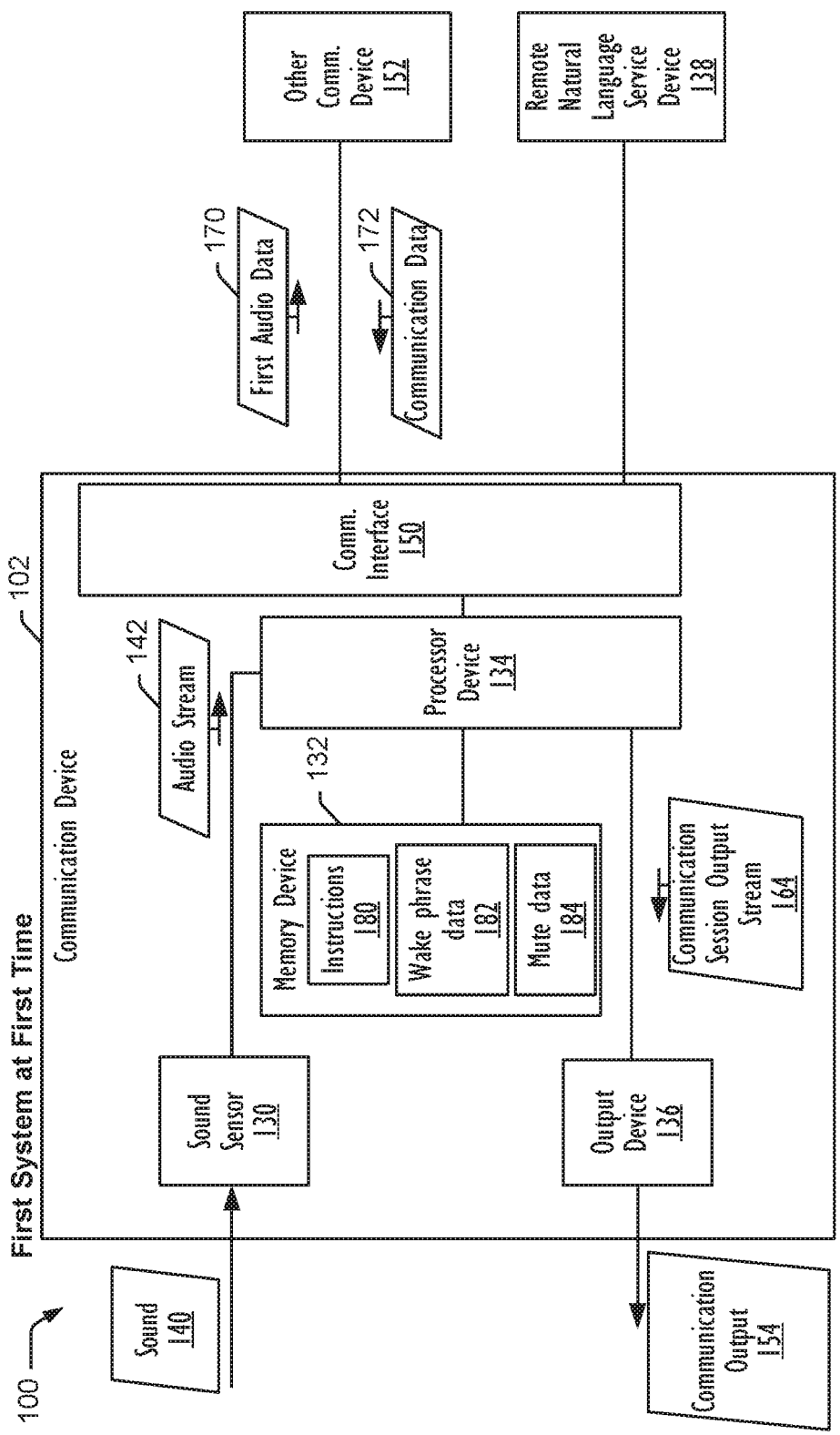
FIG. 1A is a diagram illustrating a system configured to initiate natural language processing of audio data generated based on sound detected by a sound sensor while the sound sensor is not muted at a first time.

Reference to the drawings illustrating various views of exemplary embodiments is now made. In the following description, numerous specific details are set forth, such as specific configurations, methods, etc., in order to provide a thorough understanding of the embodiments. At least one of the described embodiments is practicable without one or more of these specific details, or in combination with other known methods and configurations. In other instances, well-known processes and techniques have not been described in particular detail to avoid obscuring the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one implementation. Thus, the appearances of the phrase "in one embodiment," "in an embodiment," "in another embodiment," "in other embodiments," "in some embodiments," or their variations in various places throughout this specification are not necessarily referring to the same embodiment. Furthermore, the particular features, structures, configurations, or characteristics are combinable in any suitable manner in one or more embodiments. In the drawings and the description of the drawings herein, certain terminology is used for convenience only and is not to be taken as limiting the embodiments of the present disclosure. Furthermore, in the drawings and the description below, like numerals indicate like elements throughout.

In the following description and claims, the terms "coupled" and "connected," along with their derivatives, are not intended as synonyms for each other. "Coupled" is used to indicate that two or more elements or components can directly or indirectly communicate with each other. "Connected" is used to indicate that two or more elements or components are directly linked with each other.

Any marks that have been referenced herein is by way of example and shall not be construed as descriptive or to limit the scope of the embodiments described herein to material associated only with such marks.

The present disclosure enables one of skill in the art to provide a system to provide natural language processing services during a communication session while a sound sensor is muted with respect to the communication session. While the sound sensor is muted, the system refrains from transmitting audio data as part of the communication session and monitors the audio data for a wake phrase. In response to detecting the wake phrase, the system initiates a natural language processing operation on the audio data.

Figure 1B:
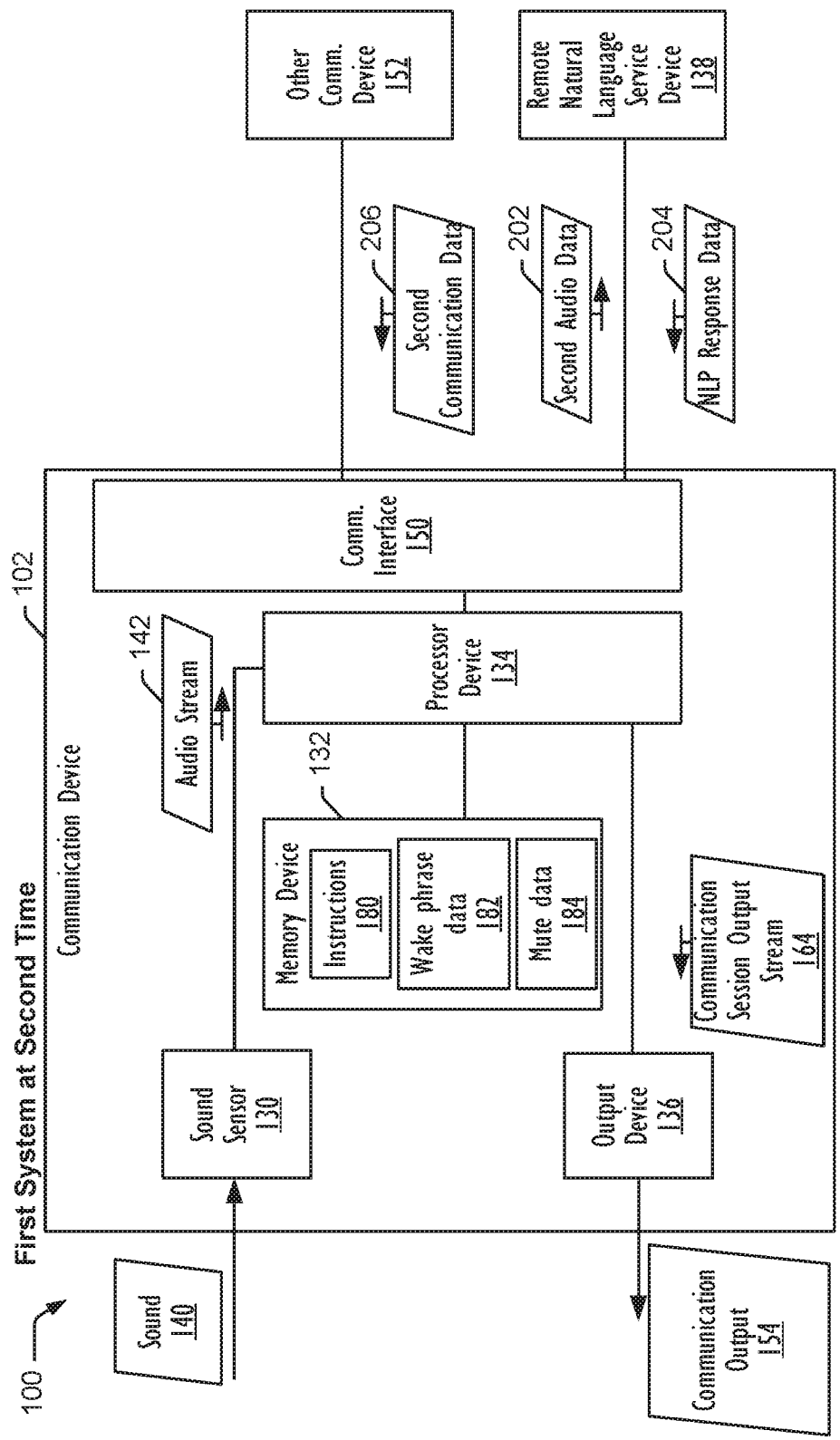
FIG. 1B is a diagram illustrating a system configured to initiate natural language processing of audio data generated based on sound detected by a sound sensor while the sound sensor is muted at a second time.

FIGS. 1A and 1B illustrate a first communication system 100 that is configured to generate audio data based on sound detected by a sound sensor while the sound sensor is muted with respect to a communication session and to initiate a natural language processing operation on the audio data. FIG. 1A depicts the first communication system 100 at a first time. The first communication system 100 includes a communication device 102, another communication device 152, and a remote natural language service device 138. While shown directly coupled, the communication device 102 may be connected with the remote natural language service device 138 and the other communication device 152 via one or more intermediate devices (e.g., a network, such as the Internet).

The communication device 102 and the other communication device 152 operate together to provide a communication session (e.g., a teleconference, phone call, voice over internet protocol chat session, etc.). Accordingly, the communication device 102 and the other communication device 152 may correspond to smartphones, personal voice over IP endpoints, teleconference equipment, etc. The communication device 102 interacts with the remote natural language service device 138 to provide support for spoken commands detected during the communication session.

The communication device 102 includes a sound sensor 130, a memory device 132, a processor device 134, an output device 136, and a communication interface 150. In some implementations, the communication device 102 includes additional components other than those illustrated. Further, connections between components of the communication device 102 may be different than illustrated. For example, the sound sensor 130, the memory device 132, the processor device 134, the output device 136, and the communication interface may be indirectly connected to each other via a communication bus. In some implementations, the sound sensor 130 and/or the output device 136 are external to the communication device 102. For example, the sound sensor 130 and/or the output device 136 may be components of a headset device in communication with the communication device 102. As another example, the sound sensor 130 and/or the output device 136 may be components of a speakerphone device in communication with the communication device 102.

The sound sensor 130 includes a microphone (e.g., a condenser microphone, a dynamic microphone, or any other type of microphone) and an analog to digital converter (A/D). In some examples, the sound sensor 130 includes a plurality of microphones and/or a plurality of A/Ds. The sound sensor 130 is configured to generate sound data based on an acoustic signal detected by the sound sensor 130. In some implementations, the sound sensor 130 corresponds to a plurality of sound sensor devices. In some implementations, the communication device 102 includes one or more image sensors (e.g., a camera) in addition to the sound sensor 130.

The memory device 132 includes a solid state device, a random access memory device, a disk drive, another type of memory, or a combination thereof. In some implementations, the memory device 132 corresponds to a plurality of memory devices.

The processor device 134 corresponds to a digital signal processor (DSP), a central processor unit (CPU), a graphics processor unit, to another type of processor, or any combination thereof. In some implementations, the processor device 134 corresponds to a plurality of processor devices. In the illustrative example of FIG. 1, the memory device 132 stores instructions 180. The processor device 134 is configured to execute the instructions 180 to perform one or more operations described herein. The memory device 132 further includes wake phrase data 182. The wake phrase data 182 identifies one or more wake phrases. Further, the memory device 132 stores a mute data 184. The mute data 184 indicates whether the sound sensor is muted or unmuted with respect to one or more communication sessions. Instructions and data illustrated and/or described as being stored in the memory device 132 may be stored in several different devices in examples in which the memory device 132 corresponds to more than one memory device.

The output device 136 includes a speaker, a display device, a digital to analog converter (D/A), or a combination thereof. In some examples, the output device 136 corresponds to a plurality of output devices. The output device 136 is configured to present output based on data received from the processor device 134.

The other communication device 152 corresponds to one or more computing devices configured to facilitate a communication session. In some examples, the other communication device 152 is analogous to the communication device 102 and includes components analogous to the sound sensor 130, the memory device 132, the processor device 134, the communication interface 150, and the output device 136.

The remote natural language service device 138 corresponds to one or more computing devices. For example, the remote natural language service device 138 may correspond to one or more servers. In some embodiments, the remote natural language service device 138 corresponds to a virtual device provided by one or more devices of a cloud service.

In operation, the communication device 102 and the other communication device 152 establish a communication session. During the communication session, the sound sensor 130 detects sound 140, generates an audio stream 142 based on the sound 140, and sends the audio stream 142 to the processor device 134. The processor device 134 determines, based on the mute data 184, whether to transmit audio data, generated based on the audio stream 142, to the other communication device 152. The mute data 184 may be set by the processor device 134 responsive to user input.

At the first time illustrated in FIG. 1A, the processor device 134 determines that the mute data 184 indicates that the sound sensor 130 is unmuted with respect to the communication session. Accordingly, the processor device 134 initiates transmission of first audio data 170, generated by the processor device 134 based on the audio stream 142, to the other communication device 152 via the communication interface 150. In some implementations, the communication device 102 generates and transmits video data to the other communication device 152 as well. The other communication device 152 may generate and present audio output based on the first audio data 170.

Additionally, the other communication device 152 sends communication data 172 to the communication device 102. The processor device 134 receives the communication data 172 via the communication interface 150 and generates a communication session output stream 164 based on the communication data 172. The communication data 172 represents sound detected at the other communication device 152. Based on the communication data 172, the processor device 134 generates a communication session output stream 164. The output device 136 receives the communication session output stream 164 and generates communication output 154. The communication output 154 includes a reproduction of sound detected by the other communication device 152. In some embodiments, the communication device 102 further receives (e.g., via the communication interface 150) and outputs (e.g., via a display device) video data from the other communication device 152 during the communication session.

In an illustrative example, the communication device 102 and the other communication device 152 establish a communication session (e.g., a conference call, a peer-to-peer call, etc.) based on input from a first user of the communication device 102 and a second user of the other communication device 152. The sound sensor 130 detects the first user saying "Hello" and adds a representation of "Hello" to the audio stream 142. The processor device 134 receives the audio stream and generates the first audio data 170 representing "Hello" based on the audio stream 142. In response to determining, based on the mute data 184, that the sound sensor 130 is not muted with respect to the communication session, the processor device 134 transmits the first audio data 170 representing "Hello" to the other communication device 152. The other communication device 152 receives the first audio data 170 representing "Hello" and presents audio output representing "Hello" accordingly. In response to hearing "Hello," the second user says "Hi." The other communication device 152 detects the second user saying "Hi" and generates the communication data 172 representing "Hi" accordingly. The other communication device 152 transmits the communication data 172 to the communication device 102. Based on the communication data 172, the processor device 134 adds a representation of "Hi" to the communication session output stream 164. The audio output device 136 presents audio output representing "Hi" based on the communication session output stream 164.

Thus, FIG. 1A illustrates operation of the communication device 102 at a first time during which the sound sensor 130 is unmuted with respect to the communication session. FIG. 1B illustrates operation of the communication device 102 at a second time during which the sound sensor 130 is muted with respect to the communication session. The second time may precede or follow the first time.

As shown in FIG. 1B, the sound sensor 130 continues generating the audio stream 142 based on the sound 140. The processor device 134 generates second audio data 202 based on the audio stream 142 at the second time and, in response to determining that the mute data 184 indicates that the sound sensor 130 is muted with respect to the communication session, the processor device 134 refrains from transmitting the second audio data 202 to the other communication device 152. In response to determining that the second audio data 202 includes a wake word identified by the wake phrase data 182, the processor device 134 initiates transmission of the second audio data 202 to the remote natural language service device 138 via the communication interface 150. In other examples, the processor device 134 initiates transmission of the second audio data 202 to the remote natural language service device 138 based on detecting selection of a "push-to-talk" button. The push-to-talk button may correspond to a physical button or to an element of a graphical user interface.

The remote natural language service device 138 performs natural language processing of the second audio data 202 to determine whether the second audio data 202 includes one or more spoken commands recognized by the remote natural language service device 138 and generates natural language processing response data 204. The natural language processing response data 204 may include an error message, one or more commands, media data or a combination thereof based on content of the second audio data 202. For example, the remote natural language service device 138 may determine that the second audio data 202 does not include a recognized spoken command. Accordingly, the natural language processing response data 204 may include an error message. As another example, the remote natural language service device 138 may identify in the second audio data 202 a spoken command requesting that the communication device 102 perform an action. Accordingly, the natural language processing response data 204 may include a command to perform the action. As another example, the remote natural language service device 138 may identify in the second audio data 202 a spoken command requesting media data. Accordingly, the natural language processing response data 204 may include the media data. Thus, the remote natural language service device 138 returns natural language processing response data 204 based on content of the second audio data 202. It should be noted that in some examples, the remote natural language service device 138 instructs another device to deliver the natural language processing response data 204, or a portion thereof, to the communication device 102. For example, the remote natural language service device 138 may identify in the second audio data 202 a spoken command that is associated with a specific service provider. Accordingly, the remote natural language service device 138 may forward the spoken command to a device associated with the specific service provider, and the device associated with the specific service provider may return response data to the communication device 102.

The processor device 134 receives the natural language processing response data 204 via the communication interface 150. Based on the natural language processing response data 204, the processor device 134 performs one or more actions as described with reference to FIGS. 2-4.

Further, while the sound sensor 130 is muted with respect to the communication session, the communication device 102 receives second communication data 206. The processor device 134 generates the communication session output stream 164 based on the second communication data 206, and the output device 136 presents output based on the communication session output stream 164. Thus, the communication device 102 may continue to present output associated with the communication session while the sound sensor 130 is muted. In some implementations, the communication device 102 further supports muting output associated with the communication session. For example, the mute data 184 may store an indication of whether output associated with the communication session is muted or unmuted. In such implementations, the processor device 134 does not generate the communication session output stream 164 based on determining that the mute data 184 indicates output is muted for the communication session.

Thus, FIGS. 1A and 1B illustrate a system that provides a communication session and that supports natural language processing of spoken commands while a sound sensor is muted with respect to the communication session. It should be noted that in some embodiments, the communication device 102 supports natural language processing of spoken commands while the sound sensor is unmuted. For example, the processor device 134 may initiate transmission of the first audio data 170 to the remote natural language service device 138 via the communication interface 150 based on detecting a wake phrase identified by the wake phrase data 182 in the first audio data 170. In other examples, the communication device 102 does not support natural language processing of spoken commands while the sound sensor is unmuted. Performing natural language processing on audio data generated while a sound sensor is muted improves a user interface functionality of a communication device. For example, a user may issue one or more spoken commands while a microphone is muted so that other participants in a communication session will not hear and be disrupted by the one or more spoken commands.

It should be noted that in some embodiments, the communication device 102 supports applying the techniques described herein to processing of gesture commands in addition/or in the alternative to processing of spoken commands. For example, the communication device 102 may initiate processing of gesture commands depicted in images captured by a camera during the communication session while the camera is disabled with respect to the communication session. The communication device 102 may initiate processing of such gestures based on detection of a wake gesture or selection of a button. Initiating processing of gestures may include performing one or more image recognition techniques at the communication device 102 to identify an execute a gestured command and/or transmitting image data to an external device and performing an action based on gesture response data received from the external device.

Figure 2:
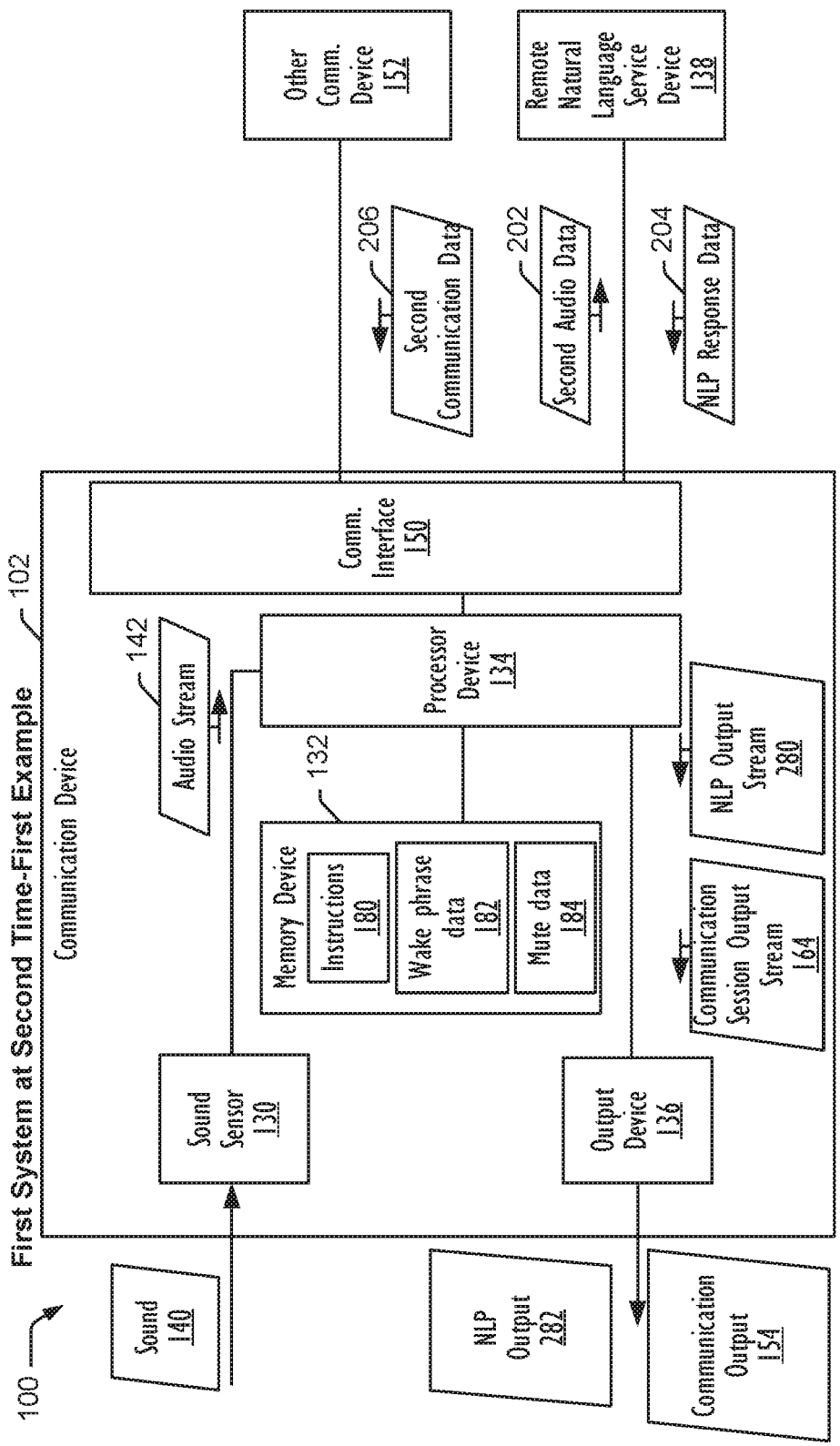
FIG. 2 is a diagram of the system of FIGS. 1A-1B generating natural language processing output based on sound detected while a sound sensor is muted.

Referring to FIG. 2, a first example of the first communication system 100 at the second time is shown. In FIG. 2, the natural language processing response data 204 includes media data. Accordingly, the processor device 134 generates a natural language processing output stream 280 based on the media data and the output device 136 presents natural language processing output 282 based on the natural language processing output stream 280.

In an illustrative use case of the first example, the sound sensor 130 detects a user saying the phrase "Polycom®, please play music" and generates the audio stream 142 including the phrase (Polycom is a registered trademark of Polycom, Inc. of San Jose, Calif.). The processor device 134 generates the second audio data 202 including the phrase based on the audio stream 142. Based on the mute data 184 indicating that the sound sensor 130 is muted with respect to the communication session, the processor device 134 refrains from transmitting the second audio data 202 to the other communication device 152. Further, in response to determining that "Polycom" corresponds to a wake phrase identified by the wake phrase data 182, the processor device 134 initiates transmission of the second audio data 202 to the remote natural language service device 138. The remote natural language service device 138 processes the phrase and returns music to the communication device 102 in the natural language response data 204. The processor device 134 generates the natural language processing output stream 280 including the music, and the output device 136 presents the music as the natural language processing output 282.

In another illustrative use case of the first example, the sound sensor 130 detects a user requesting a search for information while the sound sensor 130 is muted with respect to the communication session. The information may correspond to data from an application (e.g., E-mail), data from the Internet, or data from some other source. Accordingly, the natural language processing response data 204 may include a result of a search for the information or a command for the processor device 134 to execute a search for the information. To illustrate, in response to the user saying the phrase "Polycom, please find E-mails from John Smith" while the sound sensor 130 is muted, the phrase is added to the second audio data 202 and transmitted to the remote natural language service device 138, as described above. The remote natural language service device 138 identifies one or more E-mails from John Smith in the natural language response data 204 or instructs the processor device 134 to search for the E-mails in the memory device 132. Once the E-mails are identified, the processor device 134 generates the natural language processing output stream 280 including media data (e.g., audio and/or image data) identifying the E-mails. The output device 136 presents media identifying the E-mails based on the natural language processing output stream 280. For example, the output device 136 may output audio corresponding to the phrase "5 E-mails from John Smith have been found" and output an image showing 5 E-mails from John Smith.

Thus, FIG. 2 illustrates that the first communication system 100 may be used by a user to initiate a search for information using a spoken command while a sound sensor is muted with respect to a communication session. Accordingly, the first communication system 100 represents an improvement to a user interface function of a computing device.

Figure 3:
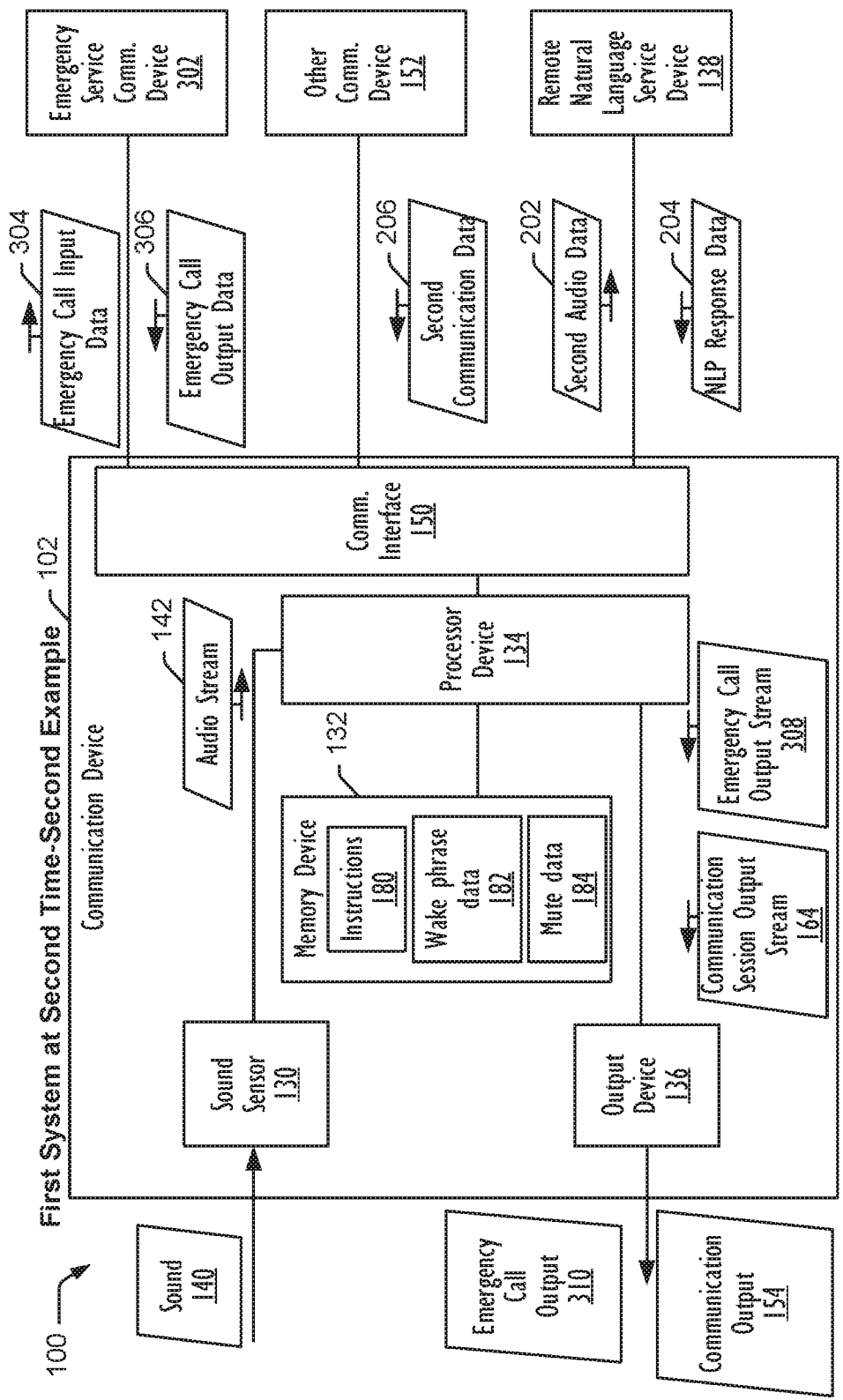
FIG. 3 is a diagram of the system of FIGS. 1A-1B generating establishing an emergency call based on sound detected while a sound sensor is muted.

Referring to FIG. 3, a second example of the first communication system 100 at the second time is shown. In FIG. 3, the second audio data 202 includes a spoken command to initiate an emergency call. Accordingly, the natural language processing response data 204 includes a command to initiate the emergency call. In response to the natural language processing response data 204, the processor device 134 establishes an emergency call between the communication device 102 and an emergency service communication device 302. The communication session with the other communication device 152 and the emergency call with the emergency service communication device 302 are conducted by the communication device 102 in parallel with neither session being put on hold. In some embodiments, the processor device 134 determines which of the other communication devices 302, 152 to transmit audio data to based on the mute data 184. As explained above, the processor device 134 sets the mute data 184 based on user input. During the emergency call, the processor device 134 generates emergency call input data 304 based on the audio stream 142. The processor device 134 initiates transmission of the emergency call input data 304 to the emergency service communication device 302 via the communication interface 150. Further, the processor device 134 receives emergency call output data 306 from the emergency service communication device 302 via the communication interface 150. Based on the emergency call output data 306, the processor device 134 generates an emergency call output stream 308. The output device 136 presents emergency call output 310 based on the emergency call output stream 308.

To illustrate, in response to the user saying the phrase "Polycom, call 911" while the sound sensor 130 is muted, the phrase is added to the second audio data 202 and transmitted to the remote natural language service device 138, as described above. The remote natural language service device 138 identifies the spoken command to call 911 and includes a command to call 911 in the natural language response data 204. Based on the natural language response data 204, the processor device 134 initiates an emergency call to the emergency service communication device 302. During the emergency call, the user says "Please send help." The sound sensor 130 adds "Please send help" to the audio stream 142 as described above. The processor device 134 generates audio data including "Please send help," and based on the mute data 184, transmits the audio data (e.g., the emergency call input data 304) to the emergency service communication device 302. An operator of the emergency service communication device 302 hears "Please send help" and says "Help is on the way." The emergency service communication device 302 includes "Help is on the way" in the emergency call output data 306. Based on the emergency call output data 306, the processor device 134 adds "Help is on the way" to the emergency call output stream 308. Based on the emergency call output stream 308, the output device 136 "Help is on the way" as audio output.

Thus, FIG. 3 illustrates that the first communication system 100 may be used by a user to initiate an emergency call using a spoken command while a sound sensor is muted with respect to a communication session. Accordingly, the first communication system 100 represents an improvement to a user interface function of a computing device. It should be noted that in other examples, the first communication system 100 may be used to initiate a non-emergency call using a spoken command while a sound sensor is muted with respect to a communication session.

Figure 4:
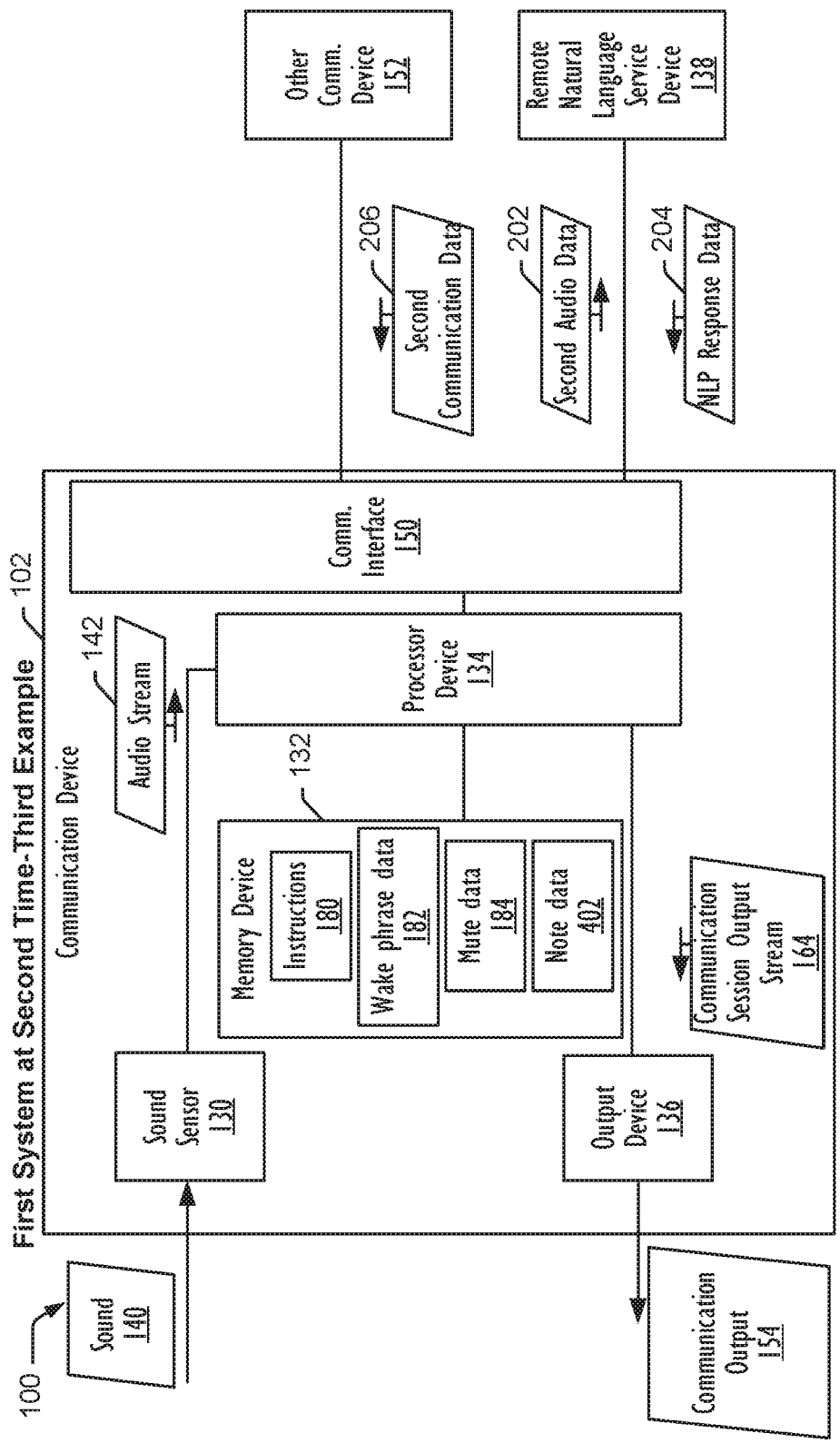
FIG. 4 is a diagram of the system of FIGS. 1A-1B storing note data based on sound detected while a sound sensor is muted.

Referring to FIG. 4, a third example of the first communication system 100 at the second time is shown. In FIG. 4, the second audio data 202 includes a spoken command to store a note. Accordingly, the natural language processing response data 204 includes a command to store the note. Based on the natural language processing response data 204, the processor device 134 stores note data 402.

In a particular use case, the user of the communication device 102 says the phrase "Polycom, remind me to review this portion of the call" while the sound sensor 130 is muted with respect to the communication session. The phrase is added to the second audio data 202 and transmitted to the remote natural language service device 138, as described above. The remote natural language service device 138 processes the phrase and includes a command to store a note in the natural language processing response data 204. The command may include text to include in the note, a timestamp associated with the note, an identifier of a communication session, or a combination thereof. Based on the natural language processing response data 204, the processor device 134 stores the note in the note data 402.

Thus, FIG. 4 illustrates that the first communication system 100 may be used by a user to initiate storage of a note using a spoken command while a sound sensor is muted with respect to a communication session. Accordingly, the first communication system 100 represents an improvement to a user interface function of a computing device.

Figure 5A:
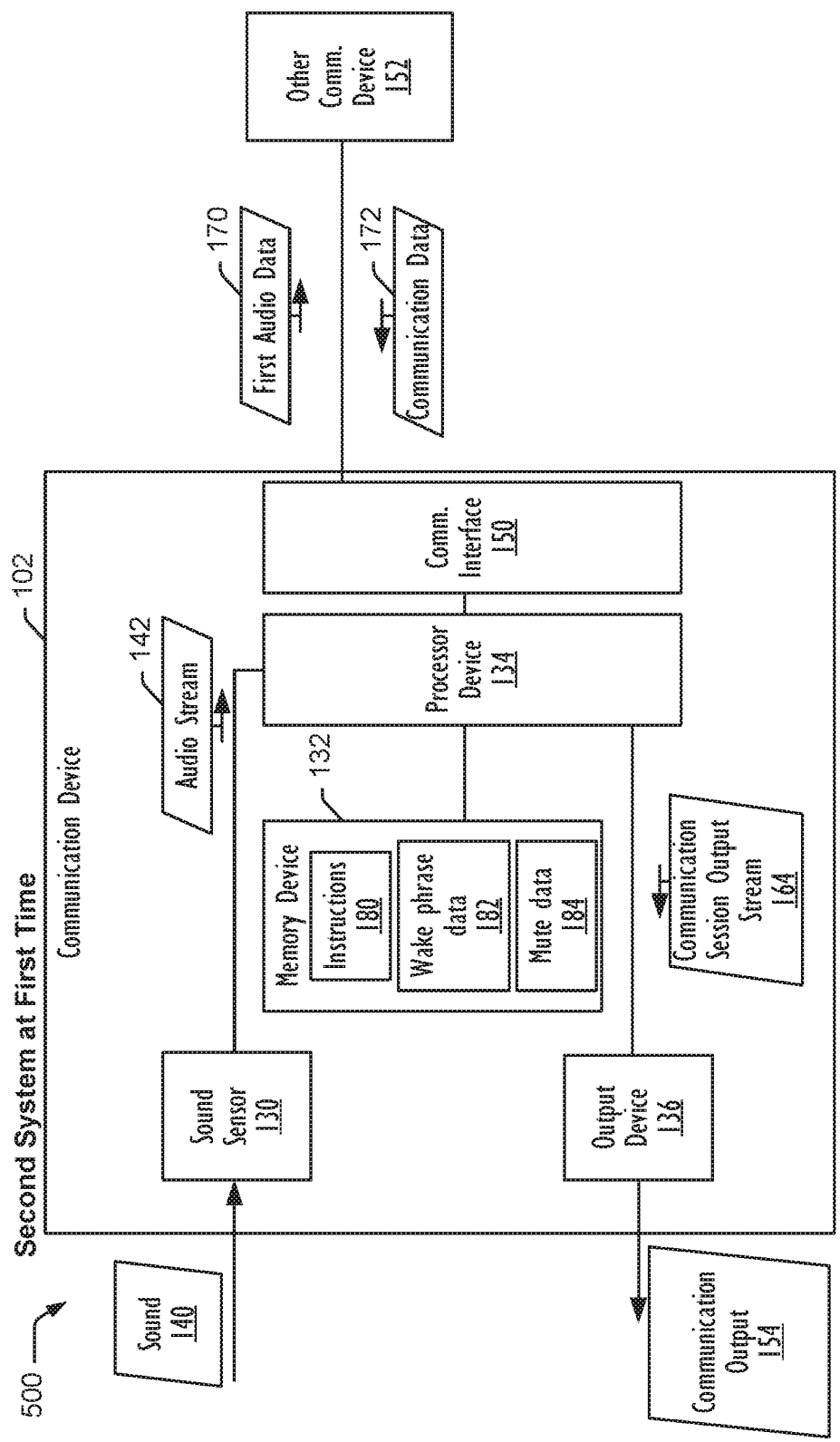
FIG. 5A is a diagram illustrating a system configured to initiate natural language processing of audio data generated based on sound detected by a sound sensor while the sound sensor is muted at a first time.
Figure 5B:
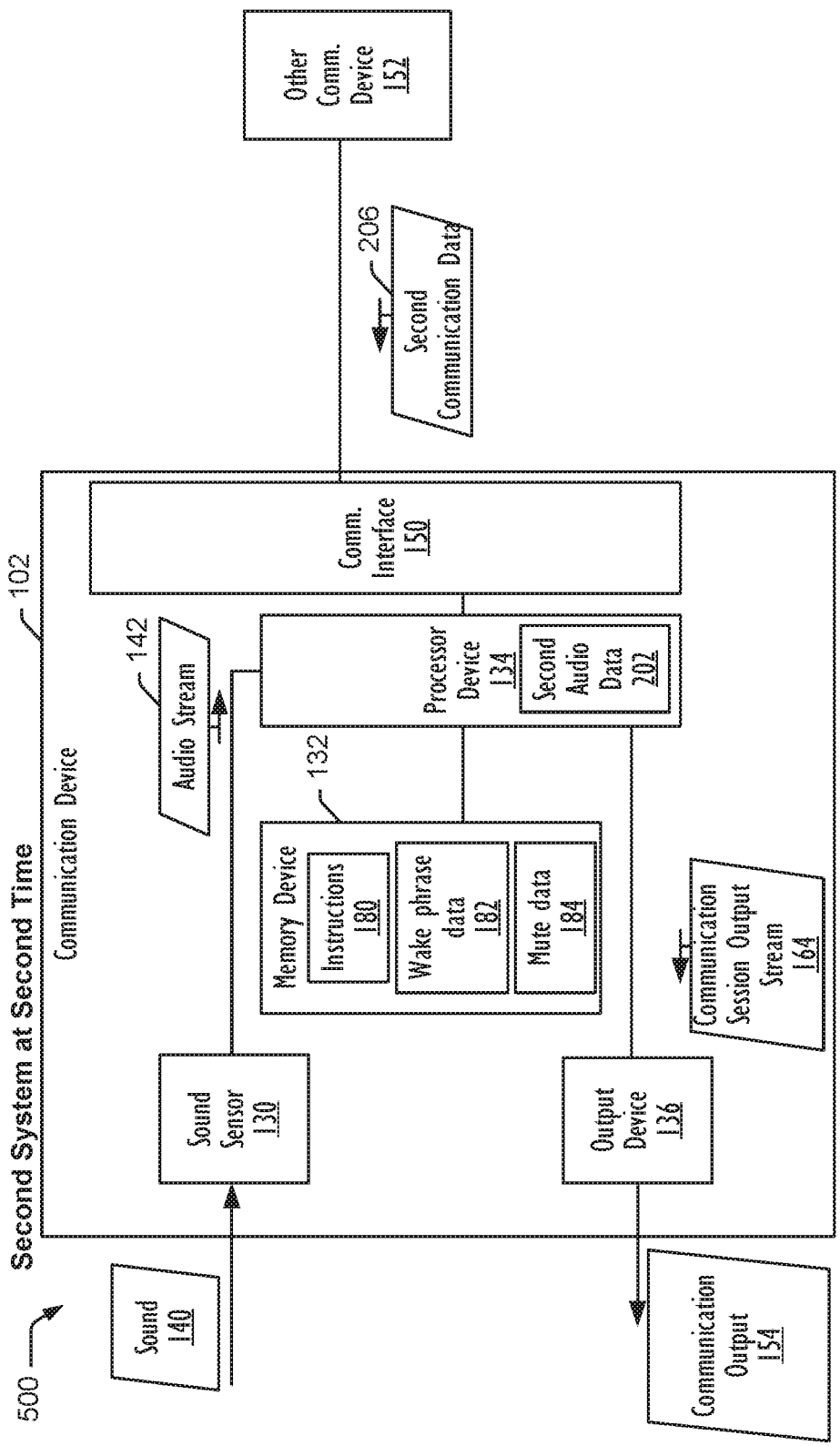
FIG. 5B is a diagram illustrating a system configured to initiate natural language processing of audio data generated based on sound detected by a FIG. 2 is a diagram of the system of FIGS. 1A-1B generating natural language processing output based on sound detected while a sound sensor is muted.

FIGS. 5A and 5B illustrate a second communication system 500 that is configured to generate audio data based on sound detected by a sound sensor while the sound sensor is muted with respect to a communication session and to perform a natural language processing operation on the audio data. The second communication system 500 corresponds to the first communication system 100 except that the processor device 134, executing the instructions 180, is configured to perform natural language processing locally rather than to send audio data to a remote natural language processing device. Accordingly, the communication device 102 may initiate a natural language processing operation on audio data by transmitting the audio data to a remote natural language processing service device, as in the first communication system 100, or by performing natural language processing locally, as in the second communication system 500.

Figure 6:
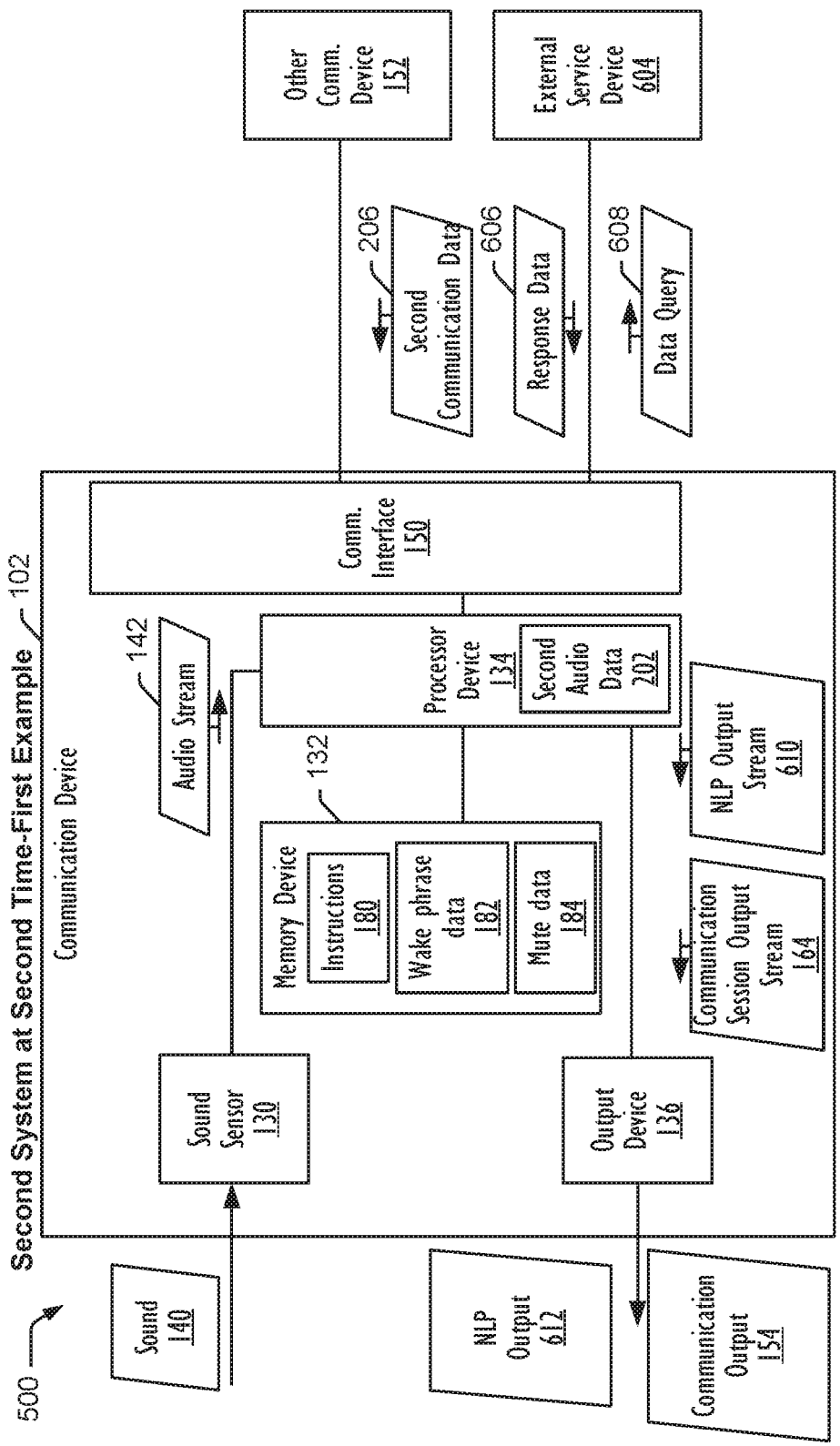
FIG. 6 is a diagram of the system of FIGS. 5A-5B generating natural language processing output based on sound detected while a sound sensor is muted.

Referring to FIG. 6, a first example of the second communication system 500 at the second time is shown. In FIG. 2, the second audio data 202 includes a spoken command that corresponds to a request for information and/or media content. In the illustrated example, the processor device 134 initiates transmission of a data query 608 for the information and/or media content to an external service device 604 based on the spoken command. The external service device 604 includes the information and or/media content (or an error message) in response data 606 transmitted to the communication device 102. The processor device 134 receives generates a natural language processing output stream 610 based on the natural language processing response data 606, and the output device 136 presents natural language processing output 612 based on the natural language processing output stream 610. The natural language processing output 612 includes audio output, image output, or a combination thereof.

In other examples, the processor device 134 searches the memory device 132 for the information and/or media content based on the spoken command in the second audio data 202.

In an illustrative use case of the first example, the sound sensor 130 detects a user saying the phrase "Polycom, please play music" and generates the audio stream 142 including the phrase. The processor device 134 generates the second audio data 202 including the phrase based on the audio stream 142. Based on the mute data 184 indicating that the sound sensor 130 is muted with respect to the communication session, the processor device 134 refrains from transmitting the second audio data 202 to the other communication device 152. Further, in response to determining that "Polycom" corresponds to a wake phrase identified by the wake phrase data 182, the processor device 134 initiates natural language processing of the second audio data 202. Based on identifying a spoken command to play music in the second audio data 202, the processor device 134 sends the data query 608 to the external service device 604 The external service device 604 returns the music in the natural language processing response data 606. The processor device 134 generates the natural language processing output stream 610 including the music, and the output device 136 presents the music as the natural language processing output 612.

In another illustrative use case of the first example, the sound sensor 130 detects a user requesting a search for information while the sound sensor 130 is muted with respect to the communication session. To illustrate, in response to the user saying the phrase "Polycom, please find E-mails from John Smith" while the sound sensor 130 is muted, the processor device 134 sends the data query 608 to the external service device 604. The external service device 604 sends the natural language processing response data 606 including the one or more E-mails (or an error message) to the communication device 102. The output device 136 presents media identifying the E-mails based on the natural language processing output stream 610. For example, the output device 136 may output audio corresponding to the phrase "5 E-mails from John Smith have been found" and output an image showing 5 E-mails from John Smith. As explained above, in other implementations, the processor device 134 searches the memory device 132 for the one or more E-mails based on the second audio data 202 rather than transmitting the data query 608 to the external service device 604.

Thus, FIG. 6 illustrates that the second communication system 500 may be used by a user to initiate a search for information using a spoken command while a sound sensor is muted with respect to a communication session. Accordingly, the second communication system 500 represents an improvement to a user interface function of a computing device.

Figure 7:
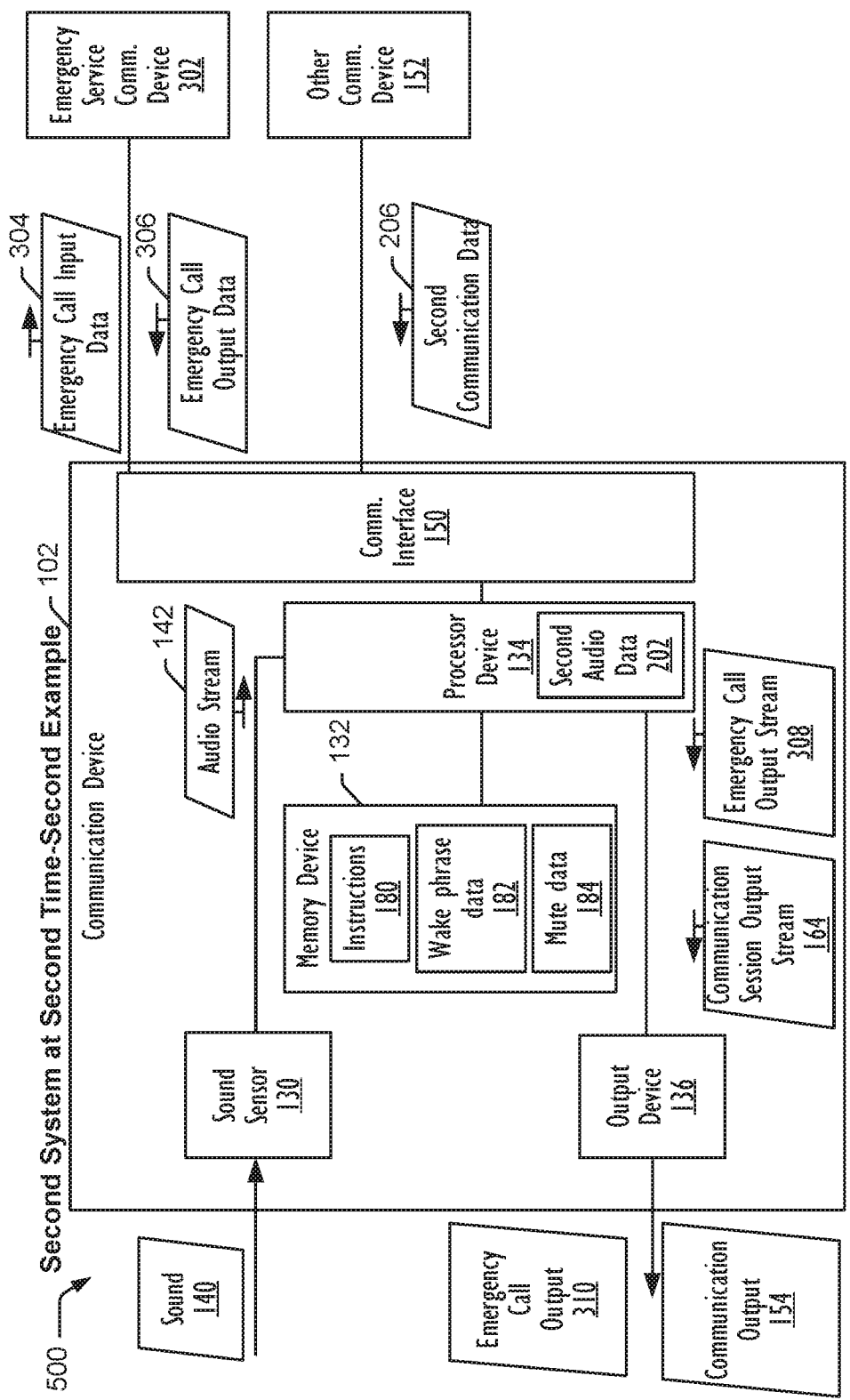
FIG. 7 is a diagram of the system of FIGS. 5A-5B generating establishing an emergency call based on sound detected while a sound sensor is muted.

Referring to FIG. 7, a second example of the second communication system 500 at the second time is shown. In FIG. 7, the second audio data 202 includes a spoken command to initiate an emergency call. In response to detecting the spoken command in the second audio data 202, the processor device 134 establishes an emergency call between the communication device 102 and the emergency service communication device 302, as described with reference to FIG. 3.

Thus, FIG. 7 illustrates that the second communication system 500 may be used by a user to initiate an emergency call using a spoken command while a sound sensor is muted with respect to a communication session. Accordingly, the second communication system 500 represents an improvement to a user interface function of a computing device. It should be noted that in other examples, the second communication system 500 may be used to initiate a non-emergency call using a spoken command while a sound sensor is muted with respect to a communication session.

Figure 8:
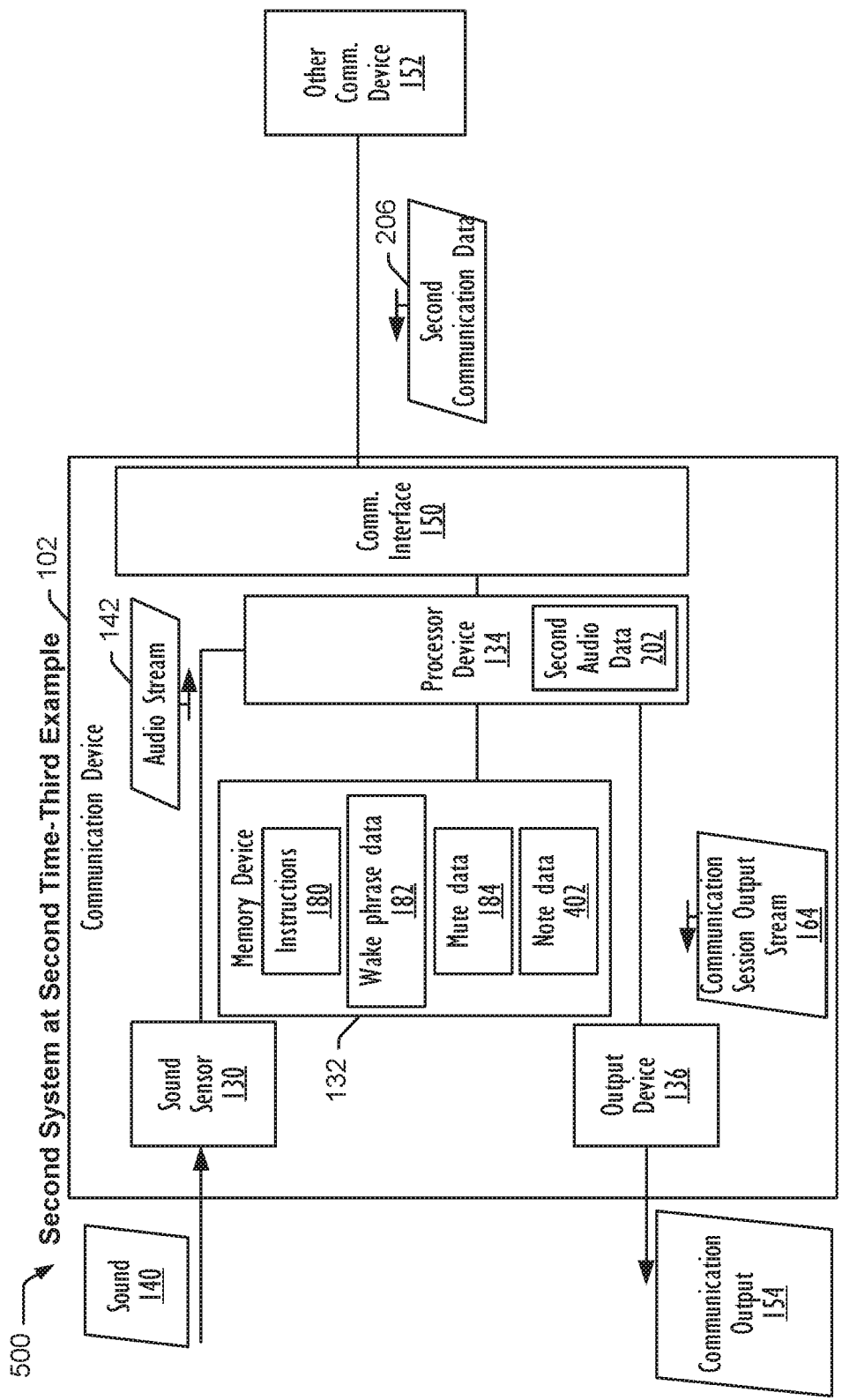
FIG. 8 is a diagram of the system of FIGS. 5A-5B storing note data based on sound detected while a sound sensor is muted.

Referring to FIG. 8, a third example of the second communication system 500 at the second time is shown. In FIG. 8, the second audio data 202 includes a spoken command to store a note. The processor device 134 performs natural language processing on the second audio data 202 and stores the note data 402 in the memory device 132 based on the spoken command.

In a particular use case, the user of the communication device 102 says the phrase "Polycom, remind me to review this portion of the call" while the sound sensor 130 is muted with respect to the communication session. The phrase is added to the second audio data 202 and the processor device 134 performs natural language processing on the second audio data 202, as described above, to generate a command to store a note. The command may include text to include in the note, a timestamp associated with the note, an identifier of a communication session, or a combination thereof. Based on the command, the processor device 134 stores the note in the note data 402.

Thus, FIG. 8 illustrates that the second communication system 500 may be used by a user to initiate storage of a note using a spoken command while a sound sensor is muted with respect to a communication session. Accordingly, the second communication system 500 represents an improvement to a user interface function of a computing device.

Figure 9:
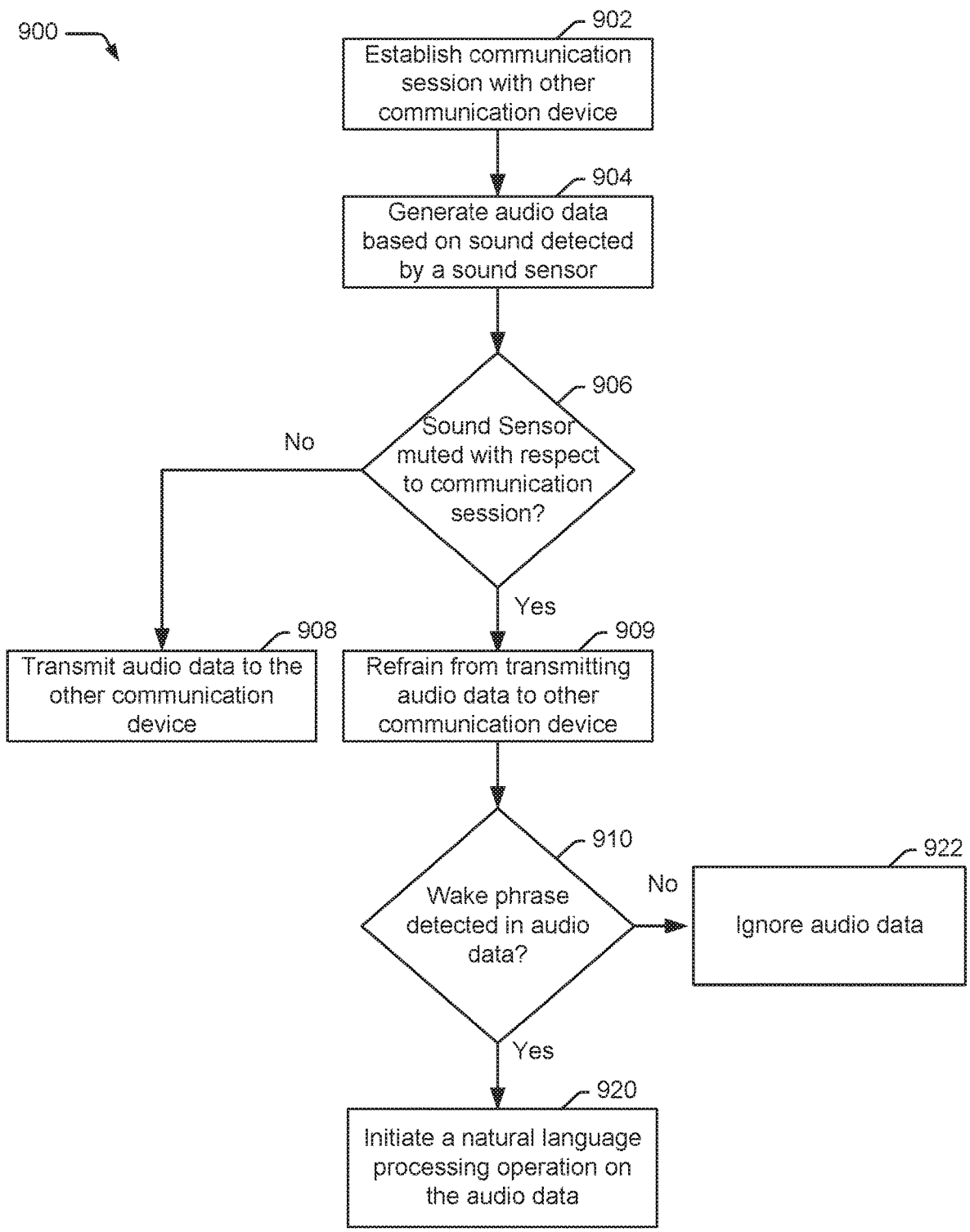
FIG. 9 is a flowchart illustrating a method of initiating natural language processing of audio data generated based on sound detected while a sound sensor.

Referring to FIG. 9, a flowchart illustrating a method 900 for initiating a natural language processing operation while a sound sensor is muted with respect to a communication session is shown. The method 900 may be performed by a communication device during a communication session between the communication device and another communication device. For example, the method 900 may be performed by the communication device 102 as depicted in FIGS. 1-4 or as depicted in FIGS. 5-8.

The method 900 includes establishing a communication session with another communication device, at 902. In an illustrative example, the communication device 102 (e.g., the processor device 134 communicating through the communication interface 150) establishes a communication session with the other communication device 152. Examples of communication sessions include a phone call, a teleconference, etc. During the communication session, the communication devices exchange audio and/or video data to facilitate communication between participants in the communication session.

The method 900 further includes generating audio data based on sound detected by a sound sensor, at 904. In a first illustrative example, the processor device 134 generates the first audio data 170 based on the sound 140 detected by the sound sensor 130 as shown in FIGS. 1A and 5A. For example, the sound sensor 130 may detect a communication session participant saying "Hello" and add data to the audio stream 142 corresponding to "Hello." The processor device 134 then may generate the first audio data 170 to represent "Hello." In a second illustrative example, the processor device 134 generates the second audio data 202 based on the sound 140 detected by the sound sensor 130 as shown in FIGS. 1B and 5B. For example, the sound sensor 130 may detect a communication session participant saying "Polycom, create note. Listen to this portion of the call again" and add data to the audio stream 142 corresponding to "Polycom, create note. Listen to this portion of the call again." The processor device 134 then may generate the second audio data 202 to represent "Polycom, create note. Listen to this portion of the call again."

The method 900 further includes determining whether the sound sensor is muted with respect to the communication session, at 906. In an illustrative example, the processor device 134 determines based on the mute data 184, whether the sound sensor 130 is muted with respect to the communication session with the other communication device 152.

In response to determining that the sound sensor is not muted, the method 900 includes transmitting audio data to the other communication device, at 908. In an illustrative example, the processor device 134 initiates transmission of the first audio data 170 to the other communication device 152 based on a determination that the sound sensor 130 is unmuted with respect to the communication session, as illustrated in FIGS. 1A and 5A. For example, the processor device 134 may initiate transmission of audio data representing a participant saying "Hello" to the other communication device 152 based on determining that the sound sensor 130 is unmuted. In some implementations, the method 900 includes continuing to generate audio data based on sound detected by the sound sensor, at 904. For example, the processor device 134 may continually generate audio data based on detected sound during the communication session.

In response to determining that the sound sensor is muted, the method 900 includes refraining from transmitting the audio data to the other communication device, at 909. In an illustrative example, the processor device 134 refrains from transmitting the second communication data 206 to the other communication device 152 based on a determination that the sound sensor 130 is muted with respect to the communication session, as illustrated in FIGS. 1B and 5B. For example, the processor device 134 may refrain from initiating transmission of audio data representing a participant saying "Polycom, create note. Listen to this portion of the call again" to the other communication device 152 based on determining that the sound sensor 130 is muted.

The method 900 further includes determining whether a wake phrase is detected in audio data, at 910. In an illustrative example, the processor device 134 determines whether the second audio data 202 includes a wake phrase based on the wake phrase data 182. In response to determining that the audio data does not include a wake phrase, the method 900 includes ignoring the audio data, at 922. For example, the processor device 134 may not initiate a natural language processing operation on the second audio data 202 in response to determining that the second audio data 202 does not include a wake phrase. In some implementations, the method 900 includes continuing to generate audio data based on sound detected by the sound sensor, at 904. For example, the processor device 134 may continually generate audio data based on detected sound during the communication session.

Figure 10:
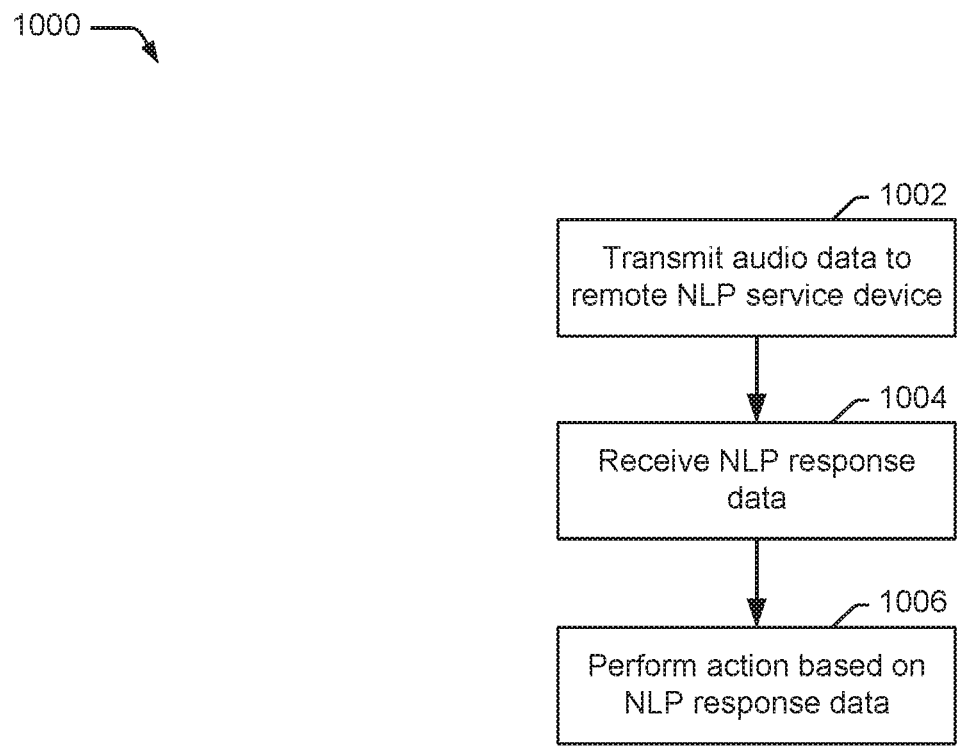
FIG. 10 is a flowchart illustrating a particular method of initiating natural language processing that may be included in the method of FIG. 9.
Figure 11:
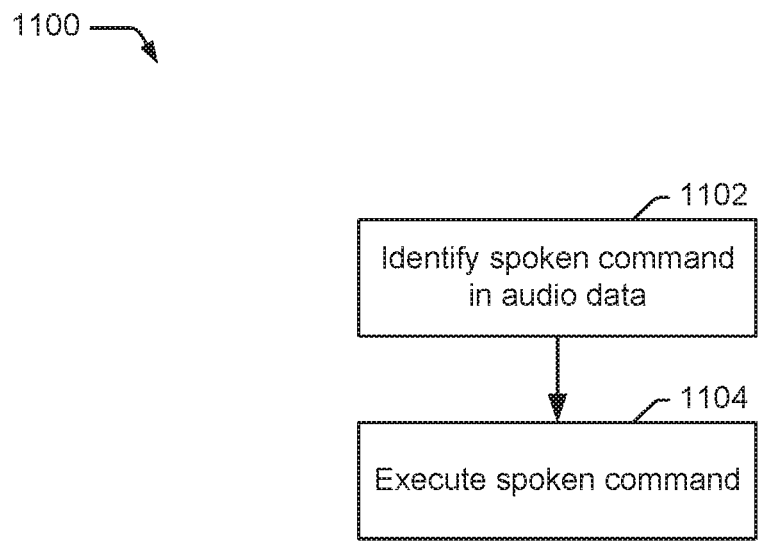
FIG. 11 is a flowchart illustrating another particular method of initiating natural language processing that may be included in the method of FIG. 9.

In response to detecting a wake phrase in the audio data, the method 900 further includes initiating a natural language processing operation on the audio data, at 920. In some implementations, the method 900 includes continuing to generate audio data based on sound detected by the sound sensor, at 904. For example, the processor device 134 may continually generate audio data based on detected sound during the communication session. FIGS. 10 and 11 illustrate two different methods for initiating a natural language processing operation on audio data. The method 900 may incorporate either of the methods shown in FIGS. 10 and 11.

Referring to FIG. 10, a first method 1000 of initiating a natural language processing operation on audio data is shown. The first method 1000 of initiating a natural language processing operation on audio data includes transmitting audio data to a remote natural language processing service device, at 1002. In an illustrative example, the processor device 134 initiates transmission of the second audio 202 to the remote natural language service device 138, as shown in FIG. 1B. For example, the processor device 134 may initiate transmission of audio data including "Polycom, create note. Listen to this portion of the call again" to the remote natural language service device 138.

The first method 1000 of initiating a natural language processing operation on audio data includes receiving natural language processing response data, at 1004. In an illustrative example, the processor device 134 receives the natural language processing response data 204, as shown in FIG. 1B. The natural language processing response data 204 includes media content, information, a command, or a combination thereof. The natural language processing response data 204 may be received from the remote natural language service device 138 or from another device.

The first method 1000 of initiating a natural language processing operation on audio data further includes performing an action based on the natural language response data, at 1006. In a first example, the processor device 134 initiates presentation of the natural language processing output 282 via the output device 136 based on the natural language response data 204, as shown in FIG. 2. To illustrate, the natural language processing response data 204 may include media content and/or information, and the processor device 134 may initiate presentation of the media content and/or information via the output device 136. In a second example, the processor device 134 initiates another communication session (e.g., an emergency call) based on the natural language response data 204, as shown in FIG. 3. In a third example, the processor device 134 stores the note data 402 in the memory device 132 based on the natural language response data 204, as shown in FIG. 4.

Referring to FIG. 11, a second method 1100 of initiating a natural language processing operation on audio data is shown. The second method 1100 of initiating a natural language processing operation on audio data includes identifying a spoken command in audio data, at 1102. In an illustrative example, the processor device 134 identifies a spoken command in the second audio data 202. The processor device 134 may identify the spoken command data using one or more audio recognition techniques and using data stored in the memory device 132 or externally to the communication device 102.

The second method 1100 of initiating a natural language processing operation on audio data further includes executing the spoken command, at 1104. In a first example, the processor device 134 initiates presentation of the natural language processing output 612 via the output device 136 based on the spoken command, as shown in FIG. 6. To illustrate, the spoken command may include a request for information and/or media content. Responsive to the spoken command, the processor device 134 may initiate transmission of the data query 608 to the external service device 604 in order to obtain the information and/or media content as the natural language processing response data 606. The processor device 134 may then generate the natural language processing output 612 based on the information and/or media content. Alternatively, the processor device 134 may search the memory device 132 for the information and/or media content rather than querying the external service device 604. In a second example, the processor device 134 initiates another communication session (e.g., an emergency call) based on the spoken command, as shown in FIG. 7. In a third example, the processor device 134 stores the note data 402 in the memory device 132 based on the spoken command, as shown in FIG. 8.

Thus, FIG. 9 illustrates a method for initiating a natural language processing operation while a sound sensor is muted with respect to a communication session is shown, and FIGS. 10-11 illustrate specific methods for initiating a natural language processing operation that may be included in the method of FIG. 9. Initiating a natural language processing operation while a sound sensor is muted enables a participant in a communication session to issue spoken commands without disturbing participants at other locations. Accordingly, the methods illustrated in FIGS. 9-11 represent an improvement to a user interface function of a computing device. It should be noted that while the method 900, illustrates wake phrase detection and natural language processing exclusively when the sound sensor is muted, the method 900 includes wake phrase detection and natural language processing when the sound sensor is unmuted in some embodiments.

Figure 12:
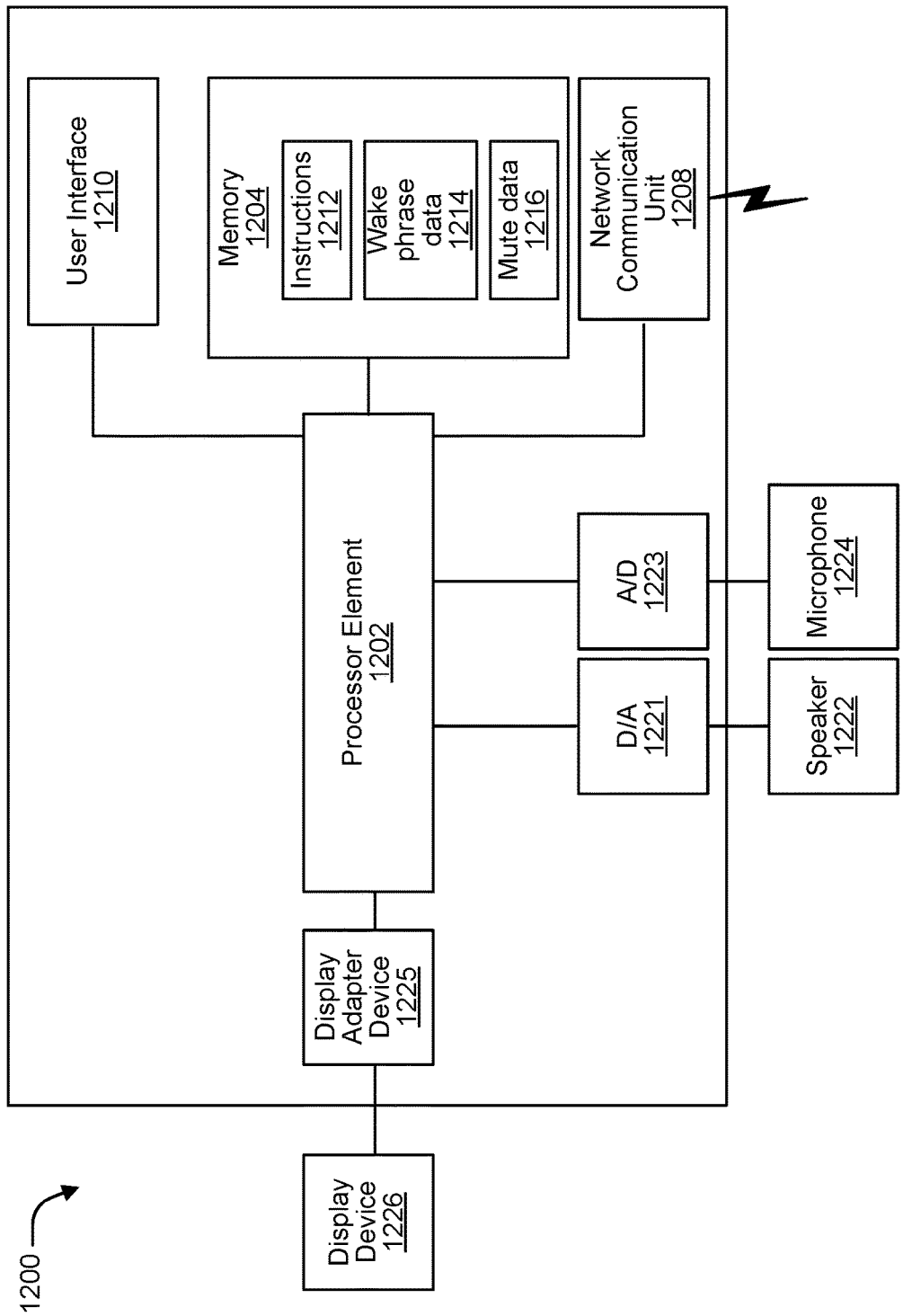
FIG. 12 illustrates a computing device corresponding to a communication device and operable to perform one or more processes or methods disclosed herein.

Referring now to FIG. 12, a block diagram illustrates a computing device 1200 that is usable to implement the techniques described herein in accordance with one or more embodiments. For example, in some implementations, the computing device 1200 corresponds the communication device 102. As shown in FIG. 12, the computing device 1200 can include one or more input/output devices, such as a network communication unit 1208 that could include a wired communication component and/or a wireless communications component, which can be coupled to processor element 1202. The network communication unit 1208 corresponds to one or more transceiver unit(s) that utilize one or more of a variety of standardized network protocols, such as Wi-Fi, Ethernet, transmission control protocol/Internet Protocol (TCP/IP), etc., to effect communications between devices. In some implementations, the network communication unit 1208 corresponds to the communications interface 150.

The computing device 1200 includes a processor element 1202 that contains one or more hardware processors, where each hardware processor has a single or multiple processor cores. In one embodiment, the processor element 1202 includes at least one shared cache that stores data (e.g., computing instructions) that are utilized by one or more other components of processor element 1202. In a particular example, the shared cache corresponds to locally cached data stored in a memory for faster access by components of the processor element 1202. In one or more embodiments, the shared cache includes one or more mid-level caches, such as level 2 (L2), level 3 (L3), level 4 (L4), or other levels of cache, a last level cache (LLC), or combinations thereof. Examples of processors include, but are not limited to, a central processing unit (CPU), a microprocessor, and a digital signal processor (DSP), a graphics processing unit (GPU), an application specific integrated circuit (ASIC), and a field-programmable gate array (FPGA). In some implementations, the processor element 1202 corresponds to the processor device 134.

FIG. 12 illustrates that a memory 1204 is operatively coupled to the processor element 1202. In some embodiments, the memory 1204 corresponds to a non-transitory medium configured to store various types of data. In an illustrative example, the memory 1204 includes one or more memory devices that comprise a non-volatile storage device and/or volatile memory. Examples of non-volatile storage devices include disk drives, optical drives, solid-state drives (SSDs), tap drives, flash memory, read only memory (ROM), and/or any other type memory designed to maintain data for a duration time after a power loss or shut down operation. An example of volatile memory is random access memory (RAM). In the illustrated example, the memory 1204 stores instructions 1212. The instructions 1212 are executable by the processor element 1202 to perform one or more of the operations or methods described with respect to FIGS. 1-11. In particular, the instructions 1212 are executable by the processor element 1202 to initiate a natural language processing operation while a sound sensor is muted. The memory 1204 further stores wake phrase data 1214 and mute data 1216. The wake phrase data 1214 may correspond to the wake phrase data 182, and the mute data 1216 may correspond to the mute data 184.

Persons of ordinary skill in the art are aware that software programs may be developed, encoded, and compiled in a variety computing languages for a variety software platforms and/or operating systems and subsequently loaded and executed by the processor element 1202. In one embodiment, the compiling process of the software program transforms program code written in a programming language to another computer language such that the processor element 1202 is able to execute the programming code. For example, the compiling process of the software program may generate an executable program that provides encoded instructions (e.g., machine code instructions) for processor element 1202 to accomplish specific, non-generic, particular computing functions.

After the compiling process, the encoded instructions are then loaded as computer executable instructions or process steps to the processor element 1202 from storage (e.g., the memory 1204) and/or embedded within the processor element 1202 (e.g., cache). The processor element 1202 executes the stored instructions or process steps in order to perform operations or process steps to transform the computing device into a non-generic, particular, specially programmed machine or apparatus. Stored data, e.g., data stored by a storage device, can be accessed by the processor element 1202 during the execution of computer executable instructions or process steps to instruct one or more components within the computing device 1200.

In the example of FIG. 12, the computing device further includes a user interface 1210 that may include a display, positional input device (such as a mouse, touchpad, touchscreen, or the like), keyboard, or other forms of user input and output devices. The user interface 1210 can be coupled to processor element 1202. Other output devices that permit a user to program or otherwise use the computing device can be provided in addition to or as an alternative to network communication unit 1208. When the output device is or includes a display, the display can be implemented in various ways, including by a liquid crystal display (LCD) or a cathode-ray tube (CRT) or light emitting diode (LED) display, such as an organic LED (OLED) display. Some implementations of the computing device do not include the user interface 1210.

The computing device 1200 further includes a camera 1220 coupled to the processor 1202. The camera 1220 may correspond to a mirrorless camera device, a digital single lens reflex camera device, or any other type of camera device. The camera 1220 is configured to provide digital video data to the processor element 1202 based on images captured by the camera 1220.

The computing device 1200 further includes a digital to analog converter (D/A) 1221 coupled to the processor element 1202 and to a speaker 1222. In some implementations, the D/A 1221 and the speaker 1222 correspond to the output device 136. The computing device 1200 further includes an analog to digital converter (A/D) 1223 coupled to the processor element 1202 and to a microphone 1224. In some implementations, the A/D 1223 and the microphone 1224 correspond to the sound sensor 130. The microphone 1224 and the A/D 1223 are configured to provide a digital representation of sound detected by the microphone 1224 to the processor element 1202. The D/A 1221 and the speaker 1222 are configured to output an acoustic signal based on a digital representation of a response received from the processor element 1202.

The computing device 1200 further includes a display adapter device 1225 coupled to the processor element 1202 and to a display device 1226. In some implementations, the display adapter device 1225 and the display device 1226 correspond to the output device 136. It should be noted that, in some embodiments, the computing device 1200 comprises other components, such as sensors and/or powers sources, not explicitly shown in FIG. 12.

As discussed above, the systems and methods described above with reference to FIGS. 1-12 enable a system to initiate a natural language processing operation while a sound sensor is muted. For example, the processor element 1202 may initiate natural language processing of spoken commands while the microphone 1224 is muted during a communication session. Accordingly, the systems and methods may be enable a participant of a communication session to issue spoken commands without disturbing or interrupting other participants in the communication session.

In a first particular example, the computing device 1200 corresponds to a smart speaker, such as an Amazon Echo® device (Amazon Echo is a registered trademark of Amazon Technologies, Inc. of Seattle, Wash.). The smart speaker device is configured to receive and respond to voice commands spoken by a user.

In a second particular example, the computing device 1200 corresponds to a different type of device executing an intelligent personal assistant service, such as Alexa® (Alexa is a registered trademark of Amazon Technologies, Inc. of Seattle, Wash.), that is responsive to voice commands.

In a third particular example, the computing device 1200 corresponds to a conference endpoint device (e.g., a video and/or voice conference device). The conference endpoint device is configured to exchange audio and/or video signals with another conference endpoint during a video or audio conference. The conference endpoint device is further configured to respond to voice commands using one or more natural language recognition services, such as Alexa, while the microphone 1224 is muted with respect to the video or audio conference and/or to respond to gesture commands using one or more gesture recognition services while the camera 1220 is disabled with respect to the video or audio conference.

In a fourth particular example, the computing device 1200 corresponds to a smartphone device or other device configured to support peer-to-peer communication sessions. The smartphone device or other device is configured to exchange audio and/or video signals with another conference endpoint during a communication session. The smartphone or other device is further configured to respond to voice commands using one or more natural language recognition services, such as Alexa, while the microphone 1224 is muted with respect to the communication session and/or to respond to gesture commands using one or more gesture recognition services while the camera 1220 is disabled with respect to the communication session.

As illustrated by the various examples, the disclosed embodiments represent an improvement to user interfaces that operate on detected speech. In particular, the disclosed embodiments are more convenient because spoken commands may be issued and interpreted without interrupting a communication session. Accordingly, the disclosed systems and methods represent an improvement to how computing devices provide user interfaces.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

Use of the term "optionally" with respect to any element of a claim means that the element is required, or alternatively, the element is not required, both alternatives being within the scope of the claim. Use of broader terms such as comprises, includes, and having is understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments are useable in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that has a publication date after the priority date of this application.

What is claimed is:

1. An apparatus comprising:
   a sound sensor;
   an audio output device;
   one or more communication interfaces;
   one or more processor devices coupled to the sound sensor, the audio output device and the one or more communication interfaces; and
   one or more memory devices coupled to the one or more processor devices and storing instructions executable by the one or more processor devices to:
      receive a mute data setting indicating a muted or unmuted state of a first voice communication session with a first party from a user;
      generate first audio data based on sound detected by the sound sensor at a first time;
      initiate transmission, via the one or more communication interfaces, of the first audio data to another device during the first voice communication session based on a determination that the sound sensor is unmuted with respect to the first voice communication session at the first time based on the state of the mute data setting indicating unmuted;
      generate second audio data based on sound detected by the sound sensor at a second time;
      refrain from initiating transmission of the second audio data to the other device during the first voice communication session based on a determination that the sound sensor is muted with respect to the first voice communication session at the second time based on the state of the mute data setting indicating muted;
      initiate a natural language processing operation on the second audio data based on detecting a wake phrase in the second audio data, including initiating transmission, via the one or more communication interfaces, of the second audio data to a remote natural language processing device;
      initiate a second voice communication session with a second party, via the one or more communication interfaces, based on a response from the natural language processing device to a spoken command detected in the second audio data;
      initiate transmission, via the one or more communication interfaces, of second audio data to a device of the second party during the second voice communication session based on a determination that the sound sensor is muted with respect to the first voice communication session at the second time based on the state of the mute data setting indicating muted without placing the first voice communication session on hold;
      initiate output, via the audio output device, of sound based on communication data received, via the one or more communication interfaces, from the other device during the first voice communication session and based on output data received, via the one or more communication interfaces, from the device of the second party during the second voice communication session; and
      conduct the first voice communication session and the second voice communication session in parallel.

2. The apparatus of claim 1, wherein the second voice communication session is associated with an emergency service.

3. The apparatus of claim 1, wherein initiating the natural language processing operation includes storing, in the one or more memory devices, a note associated with the first voice communication session based on a spoken command detected in the second audio data.

4. The apparatus of claim 1, wherein the second audio data includes the wake phrase.

5. A computer readable storage device storing instructions, the instructions executable by one or more processor devices to:
   receive a mute data setting indicating a muted or unmuted state of a first voice communication session with a first party from a user;
   generate first audio data based on sound detected by a sound sensor at a first time;
   initiate transmission, via one or more communication interfaces, of the first audio data to another device during the first voice communication session based on a determination that the sound sensor is unmuted with respect to the first voice communication session at the first time based on the state of the mute data setting indicating unmuted;
   generate second audio data based on sound detected by the sound sensor at a second time;
   refrain from initiating transmission of the second audio data to the other device during the first voice communication session based on a determination that the sound sensor is muted with respect to the first voice communication session at the second time based on the state of the mute data setting indicating muted;
   initiate a natural language processing operation on the second audio data based on detecting a wake phrase in the second audio data, including initiating transmission, via the one or more communication interfaces, of the second audio data to a remote natural language processing device;
   initiate a second voice communication session with a second party, via the one or more communication interfaces, based on a response from the natural language processing device to a spoken command detected in the second audio data;
   initiate transmission, via the one or more communication interfaces, of second audio data to a device of the second party during the second voice communication session based on a determination that the sound sensor is muted with respect to the first voice communication session at the second time based on the state of the mute data setting indicating muted without placing the first voice communication session on hold;

initiate output, via an audio output device, of sound based on communication data received, via the one or more communication interfaces, from the other device during the first voice communication session and based on output data received, via the one or more communication interfaces, from the device of the second party during the second voice communication session; and conduct the first voice communication session and the second voice communication session in parallel.

6. The computer readable storage device of claim 5, wherein the second voice communication session is associated with an emergency service.

7. The computer readable storage device of claim 5, wherein initiating the natural language processing operation includes storing, in one or more memory devices, a note associated with the first voice communication session based on a spoken command detected in the second audio data.

8. The computer readable storage device of claim 5, wherein the second audio data includes the wake phrase.

9. A method comprising:

receiving a mute data setting indicating a muted or unmuted state of a first voice communication session from a user;

generating first audio data based on sound detected by a sound sensor at a first time;

transmitting, via one or more communication interfaces, the first audio data to another device during the first voice communication session based on a determination that the sound sensor is unmuted with respect to the first voice communication session at the first time based on the state of the mute data setting indicating unmuted;

generating second audio data based on sound detected by the sound sensor at a second time;

refraining from transmitting the second audio data to the other device during the first voice communication session based on a determination that the sound sensor is muted with respect to the first voice communication session at the second time based on the state of the mute data setting indicating muted;

initiating a natural language processing operation on the second audio data based on detecting a wake phrase in the second audio data, including initiating transmission, via the one or more communication interfaces, of the second audio data to a remote natural language processing device;

initiating a second voice communication session to a second party, via the one or more communication interfaces, based on a response from the natural language processing device to a spoken command detected in the second audio data;

initiating transmission, via the one or more communication interfaces, of second audio data to a device of the second party during the second voice communication session based on a determination that the sound sensor is muted with respect to the first voice communication session at the second time based on the state of the mute data setting indicating muted without placing the first voice communication session on hold;

initiating output, via an audio output device, of sound based on communication data received, via the one or more communication interfaces, from the other device during the first voice communication session and based on output data received, via the one or more communication interfaces, from the device of the second party during the second voice communication session; and conducting the first voice communication session and the second voice communication session in parallel.

10. The method of claim 9, wherein the second voice communication session is associated with an emergency service.

* * * * *